US008885537B2

(12) United States Patent  
Mourad et al.

(10) Patent No.: US 8,885,537 B2
(45) Date of Patent: Nov. 11, 2014

(54) SIGNALLING FOR DIGITAL BROADCASTING SYSTEM

(75) Inventors: Alain Mourad, Middlesex (GB); Ismael Gutierrez, Middlesex (GB)

(73) Assignee: Samsung Electronics Co., Ltd (KR)

( * ) Notice: Subject to any disclaimer, the term of this patent is extended or adjusted under 35 U.S.C. 154(b) by 447 days.

(21) Appl. No.: 13/248,637

(22) Filed: Sep. 29, 2011

(65) Prior Publication Data

US 2012/0076127 A1    Mar. 29, 2012

(30) Foreign Application Priority Data

Sep. 29, 2010    (GB) .................................. 1016407.7

(51) Int. Cl.
| | |
|---|---|
| *H04H 20/71* | (2008.01) |
| *H04H 20/42* | (2008.01) |
| *H04L 5/00* | (2006.01) |
| *H04L 1/00* | (2006.01) |

(52) U.S. Cl.
CPC ........... *H04L 5/0053* (2013.01); *H04H 20/426* (2013.01); *H04H 2201/16* (2013.01); *H04L 5/0048* (2013.01); *H04L 5/0007* (2013.01); *H04L 1/0079* (2013.01)
USPC ........................................................ 370/312

(58) Field of Classification Search
USPC ................... 370/310–349, 464–477
See application file for complete search history.

(56) References Cited

U.S. PATENT DOCUMENTS

| 8,498,312 B2 * | 7/2013 | Pekonen et al. .............. 370/474 |
| 2009/0190677 A1 | 7/2009 | Jokela et al. |
| 2009/0203326 A1 | 8/2009 | Vesma et al. |
| 2010/0226426 A1 | 9/2010 | Tupala et al. |

FOREIGN PATENT DOCUMENTS

| EP | 1 901 491 | 3/2008 |
| EP | 2 086 155 | 8/2009 |
| EP | 2 096 777 | 9/2009 |

OTHER PUBLICATIONS

DVB BlueBook A122, TM3980 Rev. 5.*
Erik Dahlman et al., "3G Evolution: HSPA and LTE for Mobile Broadband; Chapter 16: Downlink Transmission Scheme," XP-002637031, Jun. 1, 2008.
Digital Video Broadcasting (DVB); Frame Structure Channel Coding and Modulation for a Second Generation Digital Terrestrial Television Broadcasting System (DVB-T2).
ETSI EN 302 755 V1.1.1, Sep. 2009.

* cited by examiner

*Primary Examiner* — Kwang B Yao
*Assistant Examiner* — Juvena Loo
(74) *Attorney, Agent, or Firm* — The Farrell Law Firm, P.C.

(57) ABSTRACT

A method and apparatus for transmitting a plurality of data streams in a wireless broadcast system are provided. The method includes mapping the plurality of data streams onto a super-frame that includes a plurality of frames; inserting signalling information in a first signalling information field for assisting in the reception of a first number of said plurality of data streams for a given frame, the first number being less than or equal to a limit applicable to each of the plurality of frames; dependent on a number of data streams for the given frame being greater than the limit, inserting signalling information in a second signalling information field; inserting said first and second signalling information fields in a preamble section of said given frame; and transmitting the plurality of frames.

21 Claims, 17 Drawing Sheets

L1 - CONFIG

| Field | Size (bits) | |
|---|---|---|
| SUB_SLICES_PER_FRAME | 15 | |
| NUM_PLP | 8 | |
| NUM_PLP_IN_L1DYN | 8 | } 30 |
| NUM_AUX | 4 | |
| AUX_CONFIG_RFU | 8 | |
| For i=0..NUM-RF1 { | | |
|     RF_IDX | 3 | |
|     FREQUENCY | 32 | |
| } | | |
| IF S2=="xxx1 { | | |
|     FEF_TYPE | 4 | |
|     FEF_LENGTH | 22 | |
|     FEF_INTERVAL | 8 | |
| } | | |
| For i=0..NUM_PLP-1 { | | |
|     PLP_ID | 8 | |
|     PLP_TYPE | 3 | |
|     PLP_PAYLOAD_TYPE | 5 | |
|     FF_FLAG | 1 | |
|     FIRST_RF_IDX | 3 | |
|     PLP_GROUP_ID | 8 | |
|     PLP_COD | 3 | |
|     PLP_MOD | 3 | |
|     PLP_ROTATION | 1 | |
|     PLP_FEC_TYPE | 2 | |
|     PLP_NUM_BLOACKS_MAX | 10 | |
|     FRAME_INTERVAL | 8 | |
|     TIME_IL_LENGTH | 8 | |
|     TIMW_IL_TYPE | 1 | |
|     IN_BAND_FLAG | 1 | |
| } | | |
| For i=0..NUM_AUX-1 { | | |
|     AUX_RFU | 32 | |
| } | | |
| CRC_16 | 16 | |

FIG. 10

| Field | Size (bits) | |
|---|---|---|
| FRAME_IDX | 8 | |
| SUB_SLICE_INTERVAL | 22 | |
| TYPE_2_START | 22 | |
| L1_CHANGE_COUNTER | 8 | |
| START_RF_IDX | 3 | |
| For i=0..NUM_PLP_IN_L1DYN { | | |
|     PLP_ID | 8 | |
|     PLP_START | 22 | } 32 |
|     PLP_NUM_BLOCKS | 10 | |
| } | | |
| For i=0..NUM_AUX-1 { | | |
|     AUX_RFU | 16 | |
| FEF_INTERVAL | | |
| } | | |
| NUM_PLP_ext | 8 | |
| NUM_IDLE_PLP | 8 | } 34 |
| CRC_16 | 16 | |

*FIG. 11*

| Field | Size (bits) | |
|---|---|---|
| For i+0..NUM_PLP_ext { | | |
|     PLP_ID | 8 | |
|     PLP_START | 22 | |
|     PLP_NUM_BLOCKS | 10 | |
| } | | } 36 |
| For i=0..NUM_IDLE_PLP { | | |
|     PLP_ID | 8 | |
|     PLP_DELTA | 8 | |
| } | | |
| CRC_16 | 16 | |

*FIG. 12*

L1 - CONFIG

| Field | Size (bits) | |
|---|---|---|
| NUM_PLP | 8 | ⎫ |
| NUM_FIZ | 3 | ⎬ 38 |
| NUM_TIFS_a | 8 | ⎭ |
| NUM_AUX | 4 | |
| AUX_CONFIG_RFU | 8 | |
| For i=0..NUM-RF-1 { | | |
|     RF_IDX | 3 | |
|     FREQUENCY | 32 | |
| } | | |
| IF S2=="xxxI" { | | |
|     FEF_TYPE | 4 | |
|     FEF_LENGTH | 22 | |
|     FEF_INTERVAL | 8 | |
| } | | |
| For i=0 .. NUM_PLP - 1 { | | |
|     PLP_ID | 8 | |
|     PLP_TYPE | 3 | |
|     PLP_PAYLOAD_TYPE | 5 | |
|     PLP_GROUP_ID | 8 | |
|     PLP_COD | 3 | |
|     PLP_MOD | 3 | |
|     PLP_ROTATION | 1 | |
|     PLP_FEC_TYPE | 2 | ⎫ 40 |
|     PLP_TIF_NUM_BLOCKS | 10 | |
| } | | |
| For i=0..NUM_AUX-1 { | | |
|     AUX_RFU | 32 | |
| } | | |
| For i=0..NUM_FIZ{ | | ⎫ |
|     FIZ_LENGTH | 10 | ⎬ 42 |
|     FIZ_MAPPING_TYPE | 1 | ⎭ |
| } | | |
| CRC_16 | 16 | |

*FIG. 13*

L1 - DYNAMIC

| Field | Size (bits) |
|---|---|
| FRAME_IDX | 8 |
| L1_CHANGE_COUNTER | 8 |
| For i=0..NUM_TIFS_a{ | |
|     PLP_ID | 8 |
|     PLP_TIFS_START | 21 |
|     PLP_TIFS_LENGTH | 15 |
|     PLP_TIFS_TYPE | 2 |
|     PLP_TIFS_FRAME_IDX | 1 |
|     PLP_TIFS_DELTA | 4 |
|     FIZ_ID | 3 |
| } | |
| For i=0..NUM_AUX-1 { | |
|     AUX_RFU | 16 |
| } | |
| NUM_TIFS_ext | 8 |
| NUM_IDLE_PLP | 8 |
| CRC_16 | 16 |

Rows for PLP_ID through FIZ_ID braced as 44. NUM_TIFS_ext and NUM_IDLE_PLP braced as 46.

*FIG. 14*

L1 - DYNAMIC-Ext

| Field | Size (bits) |
|---|---|
| For i=0..NUM_TIFS_ext{ | |
|     PLP_ID | 8 |
|     PLP_TIFS_START | 21 |
|     PLP_TIFS_LENGTH | 15 |
|     PLP_TIFS_TYPE | 2 |
|     PLP_TIFS_FRAME_IDX | 1 |
|     PLP_TIFS_DELTA | 4 |
|     FIZ_ID | 3 |
| } | |
| For i=0..NUM_IDLE_PLP{ | |
|     PLP_ID | 8 |
|     PLP_DELTA | 8 |
| } | |
| CRC_16 | 16 |

Entire loop block braced as 48.

*FIG. 15*

INBAND SIGNALLING

| Field | Size (bits) |
|---|---|
| PADDING_TYPE | 8 |
| PLP_L1_CHANGE_COUNTER | 8 |
| NUM_IS_TIFS | 4 |
| For i=0..NUM_IS_TIFS | |
|     PLP_TIFS_START | 21 |
|     PLP_TIFS_LENGTH | 15 |
|     PLP_TIFS_TYPE | 2 |
|     PLP_TIFS_FRAME_IDX | 2 |
|     PLP_TIFS_DELTA | 4 |
|     FIZ_ID | 3 |
| } | |
| CRC_16 | 16 |

L1 - PRE

| Field | Size (bits) |
|---|---|
| Type | 8 |
| BWT_EXT | 1 |
| S1 | 3 |
| S2 | 4 |
| L1_Repetition_Flag | 1 |
| PAPR | 4 |
| PZ0_PILOT_PATTERN | 4 |
| PZ0_GUARD_INTERVAL | 3 |
| NUM_PZ | 3 |
| L1_CONFIG_MOD | 4 |
| L1_CONFIG_COD | 2 |
| L1_CONFIG_FEC_TYPE | 2 |
| L1_CONFIG_SIZE | 18 |
| L1_DYN_MOD | 4 |
| L1_DYN_COD | 2 |
| L1_DYN_FEC_TYPE | 2 |
| L1_DYN_SIZE | 18 |
| L1_DYN_INFO_SIZE | 18 |
| L1_DYN_EXTENSION | 1 |
| TX_ID_AVAILABILITY | 8 |
| CELL_ID | 16 |
| NETWORK_ID | 16 |
| T2_SYSTEM_ID | 16 |
| NUM_T2_FRAMES | 8 |
| NUM_DATA_SYMBOLS | 12 |
| REGEN_FLAG | 3 |
| Reserved | 10 |
| CRC_32 | 32 |

The rows PZ0_PILOT_PATTERN, PZ0_GUARD_INTERVAL, and NUM_PZ are grouped as 52.

*FIG. 17*

L1 - CONFIG

| Field | Size (bits) |
|---|---|
| NUM_PLP | 8 |
| NUM_FIZ | 3 |
| NUM_TIFS_a | 8 |
| NUM_AUX | 4 |
| AUX_CONFIG_RFU | 8 |
| For i=0..NUM-RF-1 { | |
|     RF_IDX | 3 |
|     FREQUENCY | 32 |
| } | |
| IF S2=="xxxl" { | |
|     FEF_TYPE | 4 |
|     FEF_LENGTH | 22 |
|     FEF_INTERVAL | 8 |
| } | |
| For i=0 .. NUM_PLP - 1 { | |
|     PLP_ID | 8 |
|     PLP_TYPE | 3 |
|     PLP_PAYLOAD_TYPE | 5 |
|     PLP_GROUP_ID | 8 |
|     PLP_COD | 3 |
|     PLP_MOD | 3 |
|     PLP_ROTATION | 1 |
|     PLP_FEC_TYPE | 2 |
|     PLP_TIF_NUM_BLOCKS | 10 |
| } | |
| For i=0..NUM_AUX-1 { | |
|     AUX_RFU | 32 |
| } | |
| For i=0..NUM_FIZ{ | |
|     FIZ_LENGTH | 10 |
|     FIZ_MAPPING_TYPE | 1 |
| } | |
| For i=0..NUM_PZ{ | |
|     PZ_FFT_SIZE | 4 |
|     PZ_PILOT_PATTERN | 1 |
|     PZ_GUARD_INTERVAL | 1 |
| } | |
| CRC_16 | 16 |

*FIG. 18*

SIGNALLING FOR DIGITAL BROADCASTING SYSTEM

PRIORITY

This application claims priority under 35 U.S.C. §119(a) to a Patent Application filed in the United Kingdom Intellectual Property Office on Sep. 29, 2010 and assigned Serial No. 1016407.7, the entire content of which is incorporated herein by reference.

1. Field of the Invention

The present invention relates generally to broadcast wireless communication systems, and more specifically, to a method and apparatus relating to transmission and reception of data streams in digital video broadcast systems.

2. Description of the Related Art

A wireless broadcast system, such as a Digital Video Broadcasting (DVB) system, may transmit data through a sequence of frames. A digital video broadcasting system may, for example, operate according to a DVB Terrestrial $2^{nd}$ Generation (DVB-T2) standard, or for example, to Advanced Televisions Systems Committee (ASIC), Integrated Services Digital Broadcasting (ISDB), or Digital Multimedia Broadcasting (DMB) standards. Each frame typically includes a preamble section and a data section, the preamble section and the data section being time-multiplexed. The data section may carry data that is arranged in the form of a number of data streams, which may also be referred to herein as Physical Layer Pipes (PLP). A PLP may carry, for example, a service such as a video channel provided to a user.

Reception of data from the frames, and reception of the data streams, may be assisted by signalling, which may typically be carried in the preamble of the frame. Such signalling carried in the preamble of the frame may be referred to as Out-of-Band (OB) signalling. In addition to, or as an alternative to OB signalling, the signalling may be carried in the data section, typically of the preceding frame. Such signalling carried in the data section may be referred to as In-Band (IB) signalling. The signalling (both Out-Of-Band and In-Band) may be referred to as physical layer signalling, or Layer 1 (L1) signalling. The signalling may indicate a modulation or coding scheme to be used for decoding data, and may further indicate, for example, sections of a data field to be decoded, or the location of a data stream within the data section.

Due to an increasing use of signal compression techniques, and provision of lower data rate services that may be more robust in particular in mobile environments, the number of data streams carried by a sequence of frames is potentially large, but thinly spread in the sense that the data streams may not all be carried within every frame. As signalling is typically required with respect to each data stream for each frame, the signalling may result in a large overhead per frame in terms of additionally required data capacity and additional power consumed by a receiver of the signalling.

Furthermore, when data streams are frequency interleaved within symbols transmitted in a data frame, it is typically necessary for a receiver to receive the whole symbol bandwidth in order to receive a data stream. As a result, the sampling rate used at the receiver is typically required to be sufficient to receive the whole symbol bandwidth. This required sampling rate places demands on the power consumption of the receiver. Power consumption is a particularly important parameter, in particular for battery-powered digital broadcasting receivers. Accordingly, there is a need for a system that reduces typically required power consumption.

SUMMARY OF THE INVENTION

An aspect of the present invention is to address at least the problems and/or disadvantages and to provide at least the advantages described below. It is an aspect of the invention to mitigate the problems with the prior art systems.

According to an aspect of the present invention, a method of transmitting data that includes a plurality of data streams in a wireless broadcast system is provided. The method includes mapping the plurality of data streams onto a super-frame that includes a plurality of frames, each frame including a preamble section and a data section, the preamble section and the data section being time-multiplexed, the data section carrying at least parts of said plurality of data streams, and the preamble section carrying at least signalling information; inserting signalling information in a first signalling information field for assisting in the reception of a first number of said plurality of data streams for a given frame, the first number being less than or equal to a limit applicable to each of the plurality of frames, and the first signalling information field being of a size that is the same for each of the plurality of frames; dependent on a number of data streams for the given frame being greater than the limit, inserting signalling information in a second signalling information field that assists in the reception of further of said plurality of data streams for the given frame, the second signalling information field being of a variable size; inserting said first and second signalling information fields in a preamble section of said given frame; and transmitting the plurality of frames.

According to another aspect of the present invention, an apparatus for transmitting data that includes a plurality of data streams in a wireless broadcast system is provided. The apparatus includes a transmitter for mapping the plurality of data streams onto a super-frame comprising a plurality of frames, each frame comprising a preamble section and a data section, the preamble section and the data section being time-multiplexed, the data section carrying at least parts of said plurality of data streams, and the preamble section carrying at least signalling information; inserting signalling information in a first signalling information field for assisting in the reception of a first number of said plurality of data streams for a given frame, the first number being less than or equal to a limit applicable to each of the plurality of frames, and the first signalling information field being of a size that is the same for each of the plurality of frames; dependent on a number of data streams for the given frame being greater than said limit, inserting signalling information in a second signalling information field for assisting in the reception of further of said plurality of data streams for the given frame, the second signalling information field being of a size that may vary from that of others of the plurality of frames; inserting said first and second signalling information fields in a preamble section of said given frame; and transmitting the plurality of frames.

According to another aspect of the present invention, a method of receiving data including a plurality of data streams in a wireless broadcast system, in which the plurality of data streams having been mapped onto a super-frame comprises a plurality of frames is provided. The method includes receiving a first information field for a given frame from among the plurality of frames, wherein each frame comprising a preamble section and a data section, the preamble section and the data section being time-multiplexed, the data section carrying at least parts of said plurality of data streams, and the preamble section carrying at least signalling information, when a preamble section of a given frame includes the first signalling information field including signalling information for assisting in the reception of a first number of said plurality of data streams for the given frame, the first number being less than or equal to a limit applicable to each of the plurality of frames, and the first signalling information field being of a size that is the same for each of the plurality of frames; and dependent on a number of data streams for the given frame being greater than said limit, a second signalling information field including signalling information for assisting in the reception of further of said plurality of data streams for the given frame, the second signalling information field being of a variable size; and receiving the second signalling information field according to an indication in the first signalling information field that indicates whether the second signalling information field is to be transmitted.

According to another aspect of the present invention, an apparatus for receiving data that includes a plurality of data streams in a wireless broadcast system, in which the plurality of data streams being mapped onto a super-frame comprises a plurality of frames is provided. The apparatus includes a receiver for receiving a first signalling information field for a given frame from among the plurality of frames, and receiving a second signalling information field according to an indication in the first signalling information field that indicates whether a second signalling information field is to be transmitted, wherein each frame includes a preamble section and a data section, the preamble section and the data section being time-multiplexed, the data section carrying at least parts of said plurality of data streams, and the preamble section carrying at least signalling information, wherein a preamble section of a given frame includes the first signalling information field including signalling information for assisting in the reception of a first number of said plurality of data streams for the given frame, the first number being less than or equal to a limit applicable to each of the plurality of frames, and the first signalling information field being of a size that is the same for each of the plurality of frames; and dependent on a number of data streams for the given frame being greater than said limit, the second signalling information field including signalling information for assisting in the reception of further of said plurality of data streams for the given frame, the second signalling information field being of a variable size.

BRIEF DESCRIPTION OF THE DRAWINGS

The above and other features and advantages of embodiments of the present invention will be more apparent from the following detailed description taken in conjunction with the accompanying drawings, in which:

FIG. 10 is a table illustrating an example of an L1-config signalling field according to an embodiment of the present invention;

FIG. 11 is a table illustrating an example of an L1-dynamic signalling field according to an embodiment of the present invention;

FIG. 12 is a table illustrating an example of an L1-dynamic-Ext signalling field according to an embodiment of the present invention;

FIG. 13 is a table illustrating another example of an L1-config signalling field according to an embodiment of the present invention;

FIG. 14 is a table illustrating another example of an L1-dynamic signalling field according to an embodiment of the present invention;

FIG. 15 is a table illustrating another example of an L1-dynamic-Ext signalling field according to an embodiment of the present invention;

FIG. 16 is a table illustrating an example of in-band signalling according to an embodiment of the present invention;

FIG. 17 is a table illustrating an example of an L1-pre signalling field according to an embodiment of the present invention;

FIG. 18 is a table illustrating another example of an L1-config signalling field according to an embodiment of the present invention.

DETAILED DESCRIPTION OF EMBODIMENTS OF THE PRESENT INVENTION

Embodiments of the present invention are described in detail herein below with reference to the accompanying drawings. In the following description, a detailed description of known functions and configurations incorporated herein may be omitted when it may obscure the subject matter of the present invention.

Embodiments of the present invention are described as follows in the context of a Digital Video Broadcasting Next Generation Handheld (DVB-NGH) standard based on the $2^{nd}$ generation terrestrial DVB-T2 system, as an example. However, other wireless broadcast systems may be utilized in accordance with other embodiments of the present invention. Further, embodiments of the present invention are not limited to transmission of digital video signals, and other signals may be transmitted in accordance with embodiments of the present invention.

Figure 1:
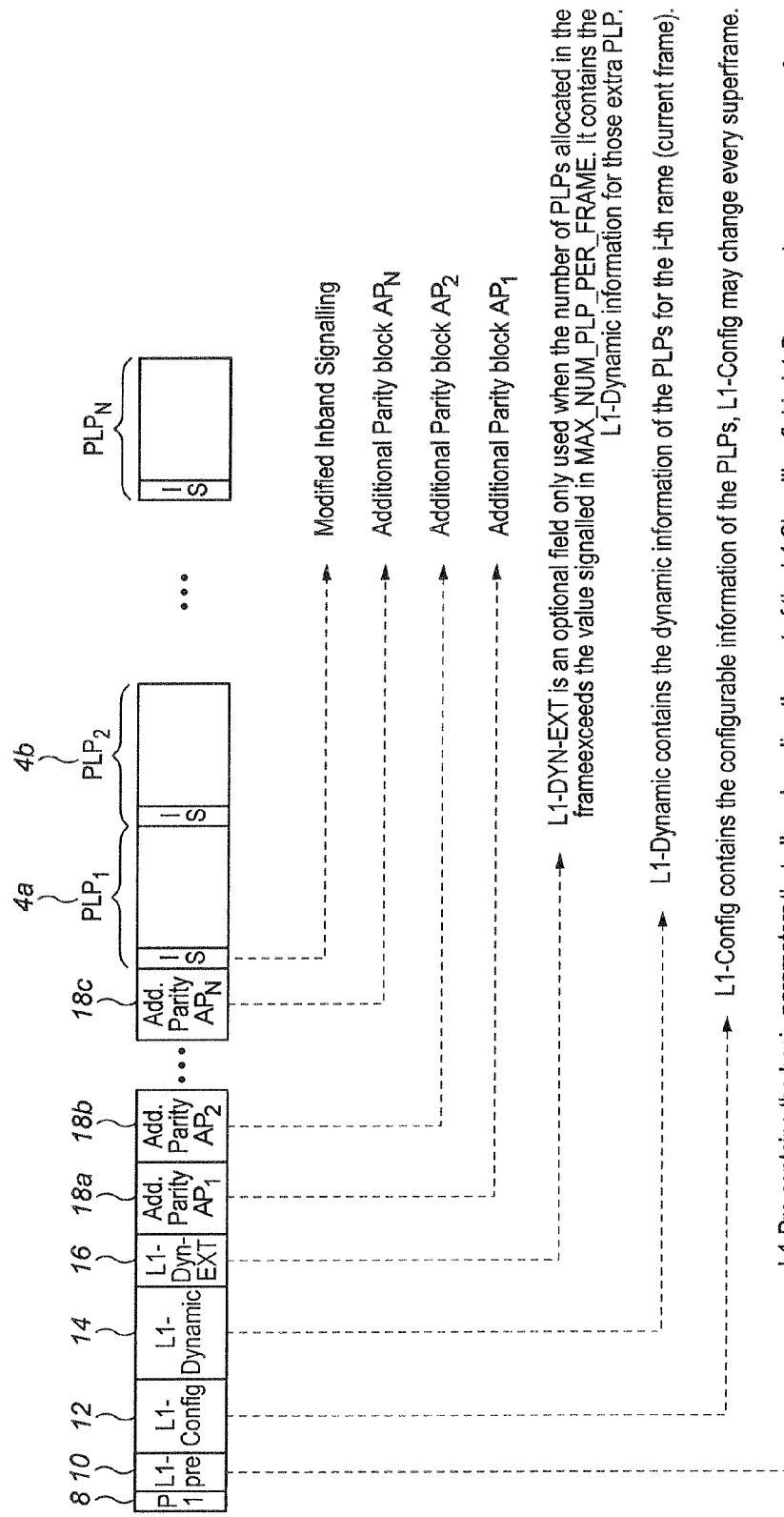
FIG. 1 is a schematic diagram illustrating a data frame according to an embodiment of the present invention.

According to an embodiment of the present invention, several data streams, which may be physical layer pipes, are mapped onto a super-frame that is made up of a series of frames. FIG. 1 shows a frame structure of a given one of the frames. The frame includes a preamble section and a data section. The preamble section includes sections "P1" 8, "L1-pre" 10, "L1-config" 12, "L1-dynamic" 14, "L1-dynamic EXT" 16 and, in this example, "Add parity AP1" 18a, and further additional parity sections AP2 18b through APN 18c. The data section includes physical layer pipes PLP1 4a, PLP2 4b, ... PLPN. In FIG. 1, the physical layer pipes are arranged sequentially in time, but in practice, can be multiplexed in frequency, for example.

The L1-Pre section contains signalling information relating at least to the modulation and coding scheme needed to receive the remainder of the preamble. The remainder of the preamble contains information necessary to receive the data section, and in particular, contains information necessary to receive the physical layer pipes within the data section. The information may contain, for example, the start address of a physical layer pipe within the data section. The signalling information within the preamble may be referred to as Out-of-Band (OB) signalling.

The L1 config section carries information that is valid for each frame of the super-frame, and may be the same for each frame of the super-frame. The L1-dynamic information may vary from frame to frame, and relates to decoding the physical layer pipe within the frame. The L1-dynamic information may include a start address of the physical layer pipe, for example. As data compression techniques improve, and as lower data rate and more robust services are offered for reception by, in particular, handheld and mobile user equipment, the number of physical layer pipes mapped onto a super-frame increases. However, each physical layer pipe, i.e., each data stream, is not necessarily mapped to every frame. Carrying signalling information, and in particular L1-dynamic information, relating to each physical layer pipe in each frame may involve a significant overhead in terms of signalling information.

Referring again to FIG. 1, according to an embodiment of the present invention, a first signalling information field is provided for assisting in the reception of a first number of data streams (e.g., L1-dynamic 14), and, if required, a second information field (e.g., L1 dynamic EXT 16) is provided for assisting in the reception of further data streams. The signalling information carried in the signalling information field may include L1-dynamic information. The number of data streams for which signalling information is carried in the first signalling information field is less than or equal to a limit applicable to each of the frames in the super-frame, and the first signalling information field is the same size for each of the frames in the super-frame.

An advantage of setting the first signalling information field of each of the plurality of frames to a single predetermined size, is that the size may be set at a value that is sufficiently large to provide robustness due to frequency diversity. An advantage of including information in a second information field that varies according to whether the number of data streams for the given frame is greater than a limit, is that additional information may be transmitted beyond the capacity limit of the first signalling information field. The first information field is accordingly kept of sufficient size to give robustness due to frequency diversity, while the second information field may accommodate extra capacity if required. The second information field may be less robust than the first information field, if the size of the second information field is less than the size of the first information field.

The first signalling information field may include information that indicates whether a second signalling information field is to be transmitted, and may also carry information that indicates a length of the second signalling information field. This information included in the first information field allows a receiver to inhibit attempts to receive the second signalling information field, in cases where the second information field will not be transmitted, while enabling the receiver to prepare to receive the second information field in cases where the second information field will be transmitted. The second information field may include information indicating idle data streams. Indication of idle data streams provides an advantage in that a receiver may inhibit attempts to receive a frame that does not carry a data stream that the receiver would otherwise be required to receive, thereby reducing power consumption.

The limit to the number of data streams for which signalling information is carried in the first signalling information field may be determined on the basis of statistical information relating to a number of active or idle data streams per frame for the plurality of frames, and/or on a basis of at least a robustness of a scheme employed for the transmission of at least one of the first and second signalling information field. The robustness scheme may include, for example, at least one of a modulation and coding scheme, a Multiple Input/Multiple Output (MIMO) scheme, a Fast Fourier Transform (FFT) size, a pilot pattern, and a guard interval. The limit to the number of data streams for which information is carried in the first signalling information field is thus determined in consideration of the robustness of the transmission of the field, so that a lower limit to the size the field may be set to a sufficient size to provide adequate robustness in consideration of frequency diversity and robustness of the transmission scheme. The field may also be set sufficiently large that the field may accommodate an expected amount of signalling information related to active and passive data streams per frame, so that any overflow of signalling information beyond the expected amount of signalling information may be carried in the second signalling information field. An indication of the limit may be carried in the preamble section of each frame, such as in the L1-config (configuration) section, for example.

As explained herein above, the first signalling information field may have a higher robustness than the second signalling information field, due to a greater degree of frequency diversity, as the first signalling information field is typically interleaved over a larger frequency range. Therefore, it may be advantageous to preferentially include, in the first signalling information field, signalling information that relates to data streams requiring higher robustness.

The first signalling field may be provided with additional robustness by the use of additional parity information, or and reduced shortening and puncturing of an error correction code.

Figure 2:
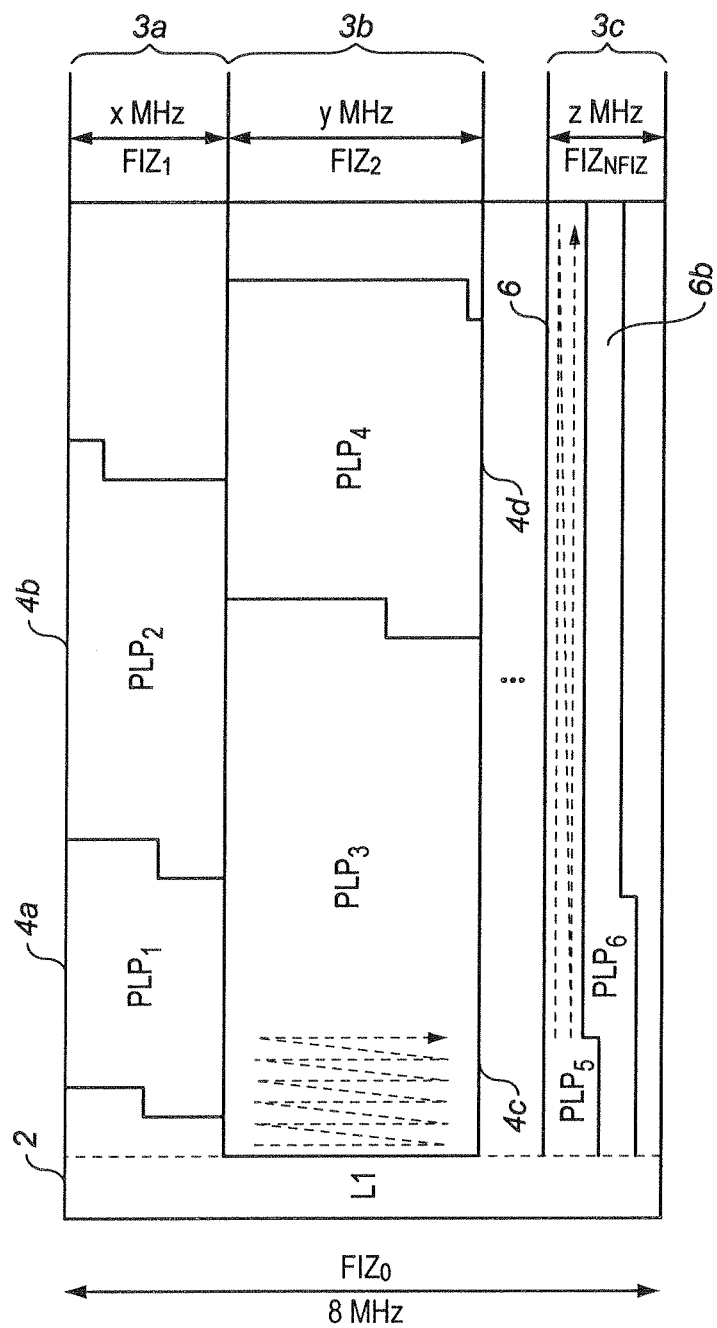
FIG. 2 is a schematic diagram illustrating signalling in a data frame according to an embodiment of the present invention.

FIG. 2 is a diagram illustrating a frame structure according to another embodiment of the present invention.

Referring to FIG. 2, the vertical axis represents frequency, and the horizontal axis represents time. At the physical layer, the frame includes a succession of Orthogonal Frequency Division Multiplexing (OFDM) symbols, each symbol including a number of subcarriers arranged at different frequencies within the frequency band of a symbol ($FIZ_0$ in FIG. 1, in this example 8 MHz).

A preamble region 2 occupies the full frequency width of the symbol. The remainder of the frame, which is the data section, carries a number of data streams that are mapped to the data section. The data section is segmented into a number of frequency zones, referred to as frequency interleaving zones, shown as $FIZ_1$ 3a, $FIZ_2$ 3b and $FIZ_{NFIZ}$ 3c in FIG. 2. The preamble carries signalling information that is used to receive the data streams within the data section. For the each of the plurality of frames in a super-frame, each frequency zone has the same position in a frequency domain.

The data streams are mapped to the frequency zones, each data stream may be mapped to a single frequency zone.

In the present example according to an embodiment of the present invention, a signalling information word that carries signalling relating to a position and bandwidth of at least said first frequency zone in a frequency domain to assist in the reception of the data stream is carried in the preamble section of at least the first frame of super-frame. However, the signalling word may additionally or alternatively be carried in the L1-config part of each frame.

The pre-amble according to the present example, which carries the signalling information word, will be transmitted within a wider frequency bandwidth (being typically the full symbol bandwidth) than each of the frequency zones. This allows the receiver to use a reduced bandwidth and so a reduced sampling rate to receive the data stream, thus reducing power consumption. However, using the full symbol bandwidth to receive the preamble section may avoid the need to duplicate information in the preamble between frequency zones, which may be needed if the receiver were to use the bandwidth of the frequency zone throughout.

Another advantage arising from reducing the transmission bandwidth, and consequently increasing a transmission time period, may be in terms of increased robustness, particularly in a mobile environment; it may be advantageous to trade-off time and frequency diversity by reducing bandwidth and increasing a transmission time period, i.e., trading a reduction in frequency diversity for a gain in time diversity.

In-band signalling may be included in the data streams of a frame. This allows the signalling information, and in particular L1-dyn, to be received within the bandwidth of a frequency zone, and accordingly, a receiver may maintain the second bandwidth for the reception of the data stream (after initially receiving the preamble in the wider bandwidth, typically in the first frame), thereby reducing power consumption.

As can be seen from FIG. 2, each frequency zone is mapped to sub-carriers of a transmission symbol that are contiguous in frequency. This mapping advantageously minimizes the frequency band occupied by a mapped frequency zone, as it would be wasteful of receiver bandwidth to leave gaps in the frequency domain.

Data may be interleaved in frequency, and the frequency interleaving sequence may vary from one orthogonal frequency division multiplexing symbol to another, which may provide greater robustness. Pilot tones may be inserted into the transmission symbol in a pattern that is independent of the segmentation of the data section of each of the plurality of frames into frequency zones. This insertion pattern simplifies the transmitter and receiver implementation, as the segmentation may be carried out independently from the arrangement of the physical layer.

As part of the process of determining bandwidths to be used for a frequency zone, which may be performed for a super-frame, a lower limit may be determined for the bandwidth of a frequency zone on a basis of an arrangement of pilot tones mapped to the frequency zone. In this way, a minimum robustness may be maintained for the transmission of the first frequency zone, since the robustness is dependent on the arrangement of the pilot tones. A certain number of pilot tones may be required to fall within the part of a symbol to which the first frequency zone is mapped.

The segmentation of the data section of each frame may be performed at logic frame level, so that the implementation of a transmitter and a receiver may be simplified and the bandwidth and position of frequency zones may be allocated flexibly.

If the data stream includes components of a scalable video coding scheme, the components may be mapped to the same frequency zone in a given frame. Such a mapping enables a receiver to fall back to a more robust component, or select a higher rate component, without changing the bandwidth used by the receiver.

Figure 3:
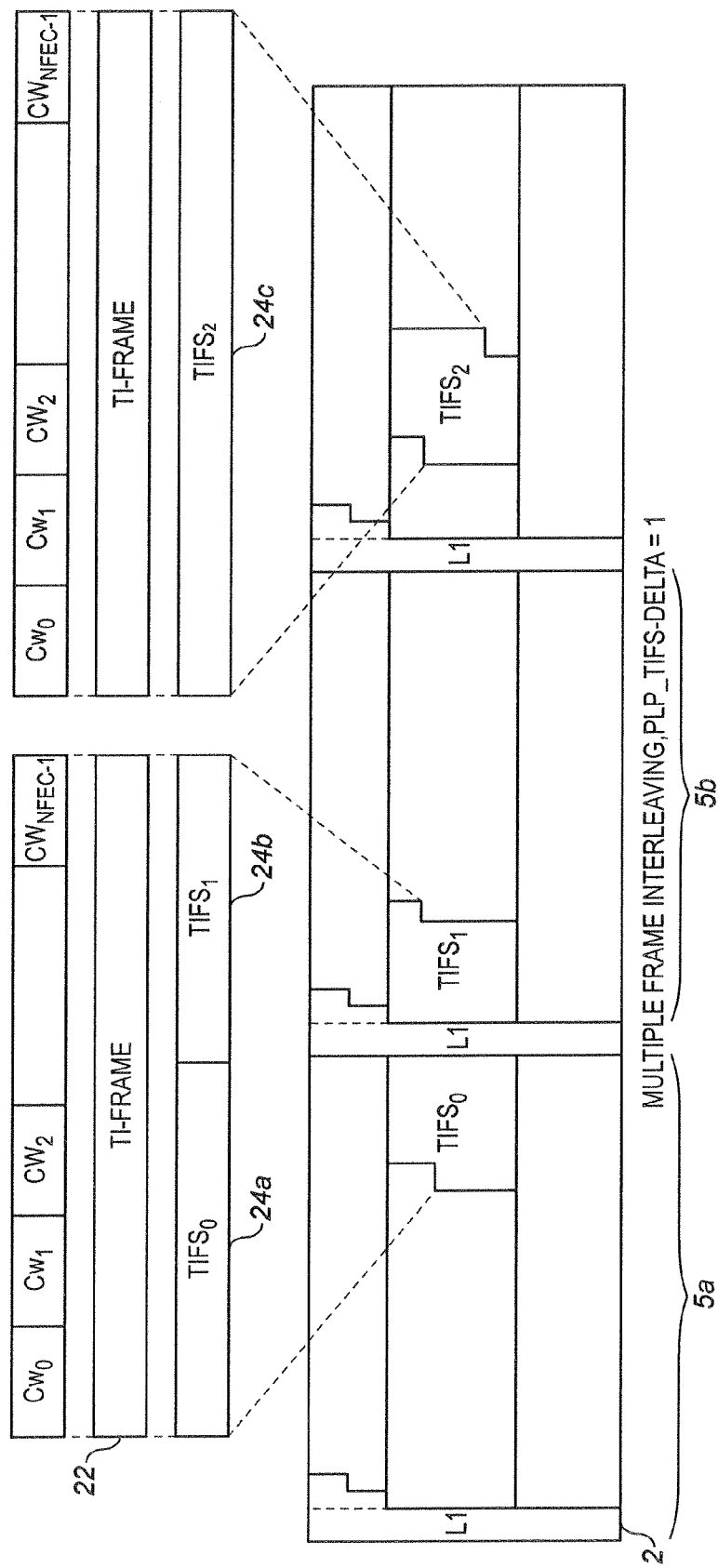
FIG. 3 is a schematic diagram illustrating mapping of time interleaving frame segments to frequency interleaving zones according to an embodiment of the present invention.

FIG. 3 is a schematic diagram showing mapping of time interleaving frame segments to frequency interleaving zones according to an embodiment of the present invention.

In addition to segmenting the data section of each frame into frequency zones, i.e., frequency interleaving zones, the data section may also be segmented into a number of time zones, or time interleaving frame segments. The data streams may first be mapped onto time interleaving frames.

Referring FIG. 3, after the data streams are first mapped onto the time interleaving frames, a time interleaving frame 22 may be then be mapped to time interleaving frame segments 24a, 24b, etc. A second signalling information word that carries signalling relating to the position of at least one of the time interleaving frame segments within a given frame may be included in the preamble section of the given frame, typically within the L1-config field.

If a time interleaving frame, or a number of time interleaving frames, were to be mapped directly onto a frequency interleaving zone, then padding may need to be included in the frequency interleaving zone if the amount of data carried by the time interleaving frame or frames is not the same as the capacity of the frequency interleaving zone. In this case, the padding would be wasted capacity, as the padding may not carry data. According to an embodiment of the present invention, as a result of the mapping of time interleaving frames to time interleaving frame segments, it may become unnecessary to add padding in a frequency zone, since the capacity of each time interleaving frame segment may be arranged to fill a remaining part of a frame efficiently. For example, as shown in FIG. 3, a time interleaving frame 22 is mapped to two time interleaving frame segments $TIFS_0$ 24a and $TIFS_1$ 24b. The first time interleaving frame segment $TIFS_0$ 24a is mapped to fill remaining capacity in a frequency interleaving zone of a first frame 5a, and the second time interleaving frame segment $TIFS_1$ 24b is mapped to a second frame 5b.

The mapping of the time interleaving frame 22 to time interleaving frame segments 24a, 24b and to the frames 5a, 5b may be done in real time, so that flexible scheduling may be realised, in which it is not necessary to determine the number of time interleaving frame segments per frame, or over how many frames 5a, 5b the time interleaving frame is mapped. The time interleaving frame may be mapped to start and end at any point within a frame 5a and at any point within a super-frame, without the need to fix these points in advance.

The second signalling information word may carry information relating to a timing of a subsequent time interleaving frame segment, so that a receiver may inhibit reception of periods between time interleaving frame segments, so saving on power consumption, and be prepared to receive subsequent time interleaving frame segments.

Frame segment 24c corresponds to a case where the TI-FRAME maps onto one time interleaving frame segment, as opposed to frame segments 24a and 24b, which correspond to the an example of splitting the TI-FRAME into more than one TIFS. Comparing the scenario reflected by 24c to the scenario reflected by 24a and 24b indicates the flexibility of the scheduler according to embodiments of the present invention.

Figure 4:
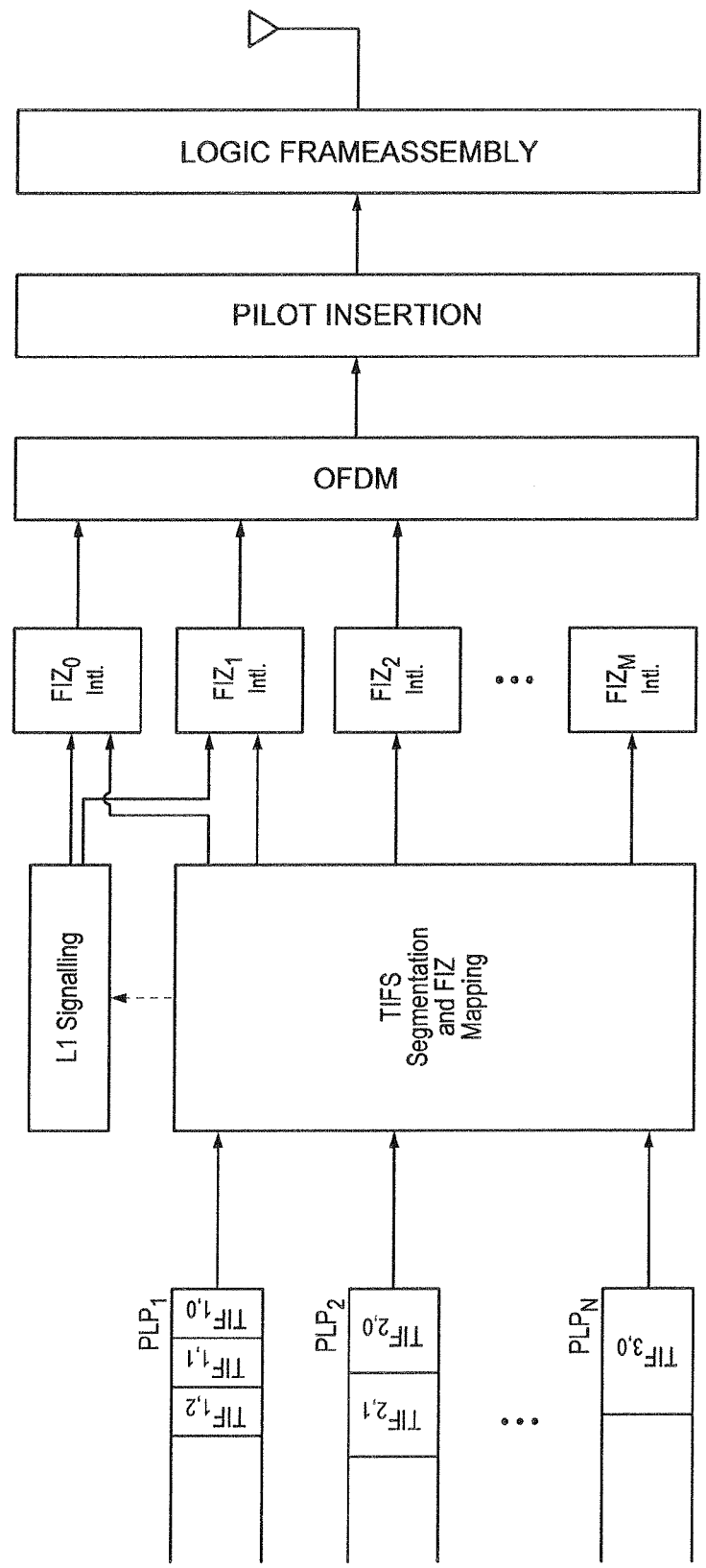
FIG. 4 is a schematic diagram illustrating a transmitter system according to an embodiment of the present invention.

FIG. 4 is a schematic diagram illustrating a transmitter system according to an embodiment of the present invention. More specifically, FIG. 4 illustrates a transmitter architecture that allows segmentation into frequency zones and time interleaving frame segments. The transmitter system of FIG. 4 utilizes the frame structure and mapping described with respect to FIGS. 2 and 3 in accordance with embodiments of the present invention.

Figure 5:
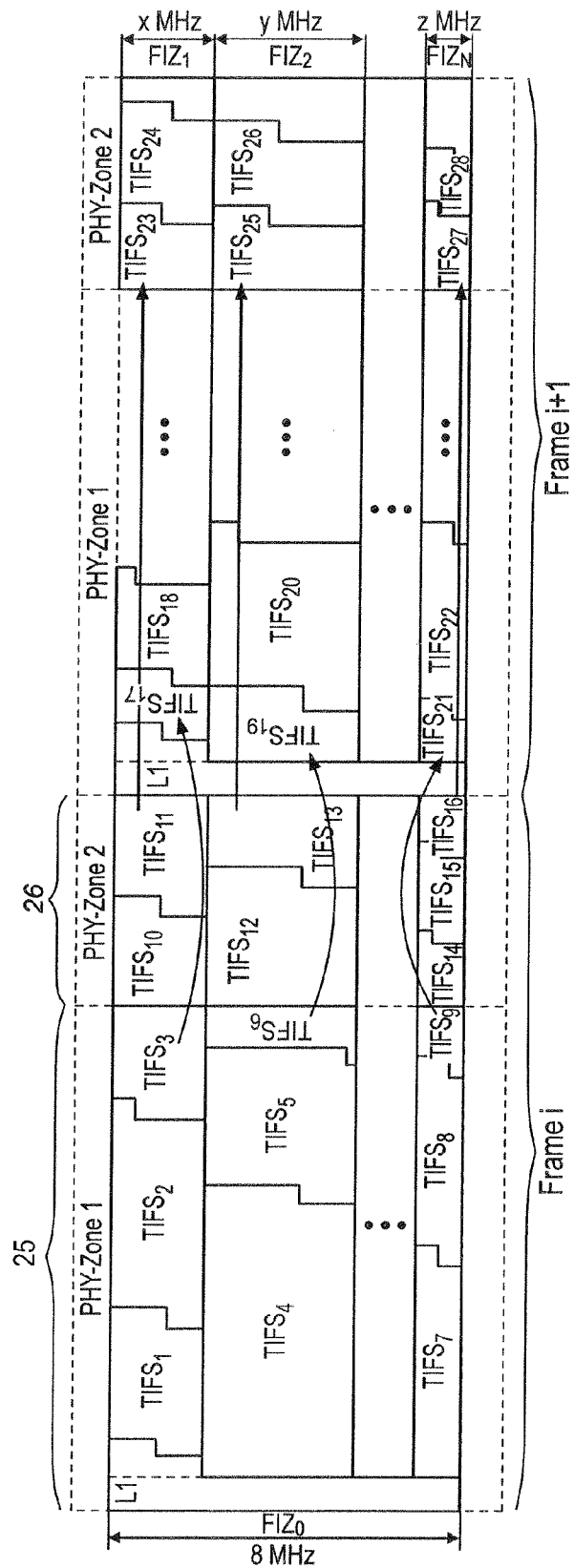
FIG. 5 is a schematic diagram illustrating mapping of frequency interleaving zones to physical layer zones according to an embodiment of the present invention.

FIG. 5 is a schematic diagram illustrating a mapping of frequency interleaving zones to physical layer zones according to an embodiment of the present invention.

Referring to FIG. 5, each frame may be divided into two or more physical layer zones, including first and second physical layer zones 25 and 26, having different physical layer characteristics. The characteristics of each physical layer zone may vary between zones in order to provide different levels of robustness, so that a mobile hand held receiver, for example, may receive a more robust zone, whereas a fixed receiver having a relatively more effective antenna may receive a higher capacity zone. The physical characteristics may vary between zones in terms of Fast Fourier Transform size, number of pilot tones, pattern of pilot tones, Multiple Input Multiple Output scheme and guard interval, for example. Each of the plurality of frequency zones may be mapped to a frequency bandwidth that is the same for each physical layer zone. This mapping allows a receiver to use the same bandwidth to receive a frequency zone within each physical layer zone of a frame.

Each time interleaved frame segment may be mapped to a single physical layer zone in a given frame.

Interleaving within a frequency interleaving zone and/or within a time interleaving frame segment may be frequency-wise interleaving, so that successive parts of a data stream are mapped across parts of an orthogonal frequency division multiplexing symbol in frequency, and then the mapping operation may proceed to map to parts of another orthogonal frequency division multiplexing symbol in frequency, etc. Alternatively, the mapping may be based upon time-wise interleaving, so that successive parts of a data stream are mapped in time across a succession of orthogonal frequency division multiplexing symbols, and then the mapping may proceed to map in time to other frequency parts of the succession of orthogonal frequency division multiplexing symbols, etc.

In a receiver, a bandwidth of an analogue filter and a sampling frequency appropriate to said second bandwidth may be set on the basis of the signalling information word, so that the receiver may be arranged for a minimum power consumption consistent with the bandwidth of the frequency zone to be received.

Figure 6:
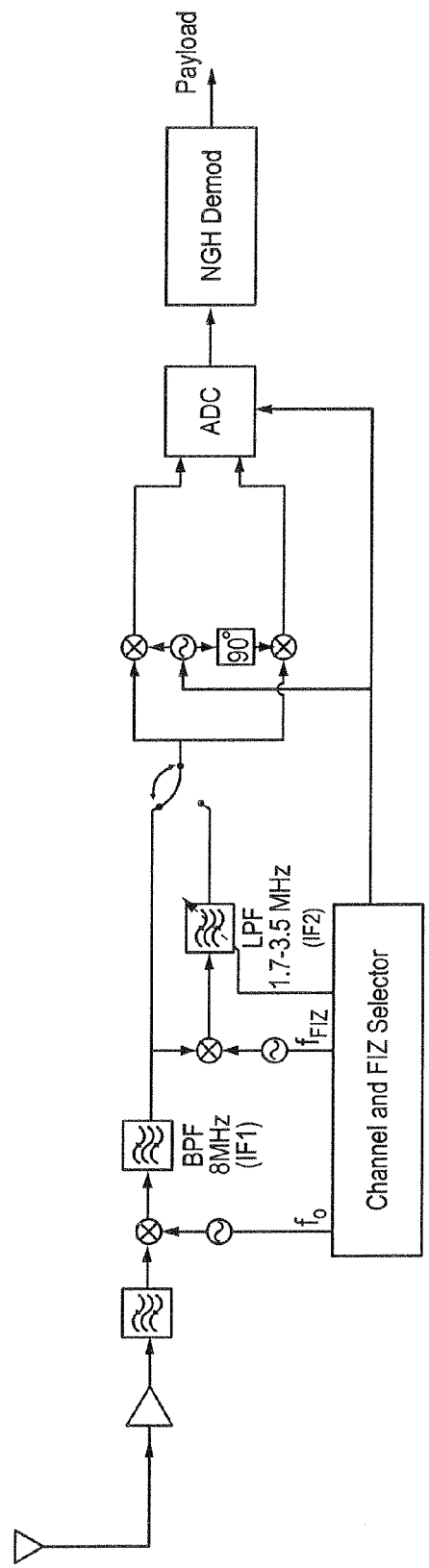
FIG. 6 is a schematic diagram illustrating an embodiment of a receiver according to an embodiment of the present invention.

FIG. 6 is a schematic diagram illustrating an embodiment of a receiver according to an embodiment of the present invention. More specifically, FIG. 6 shows an example of a receiver suitable for receiving data frames having variable bandwidth frequency zones.

Figure 7:
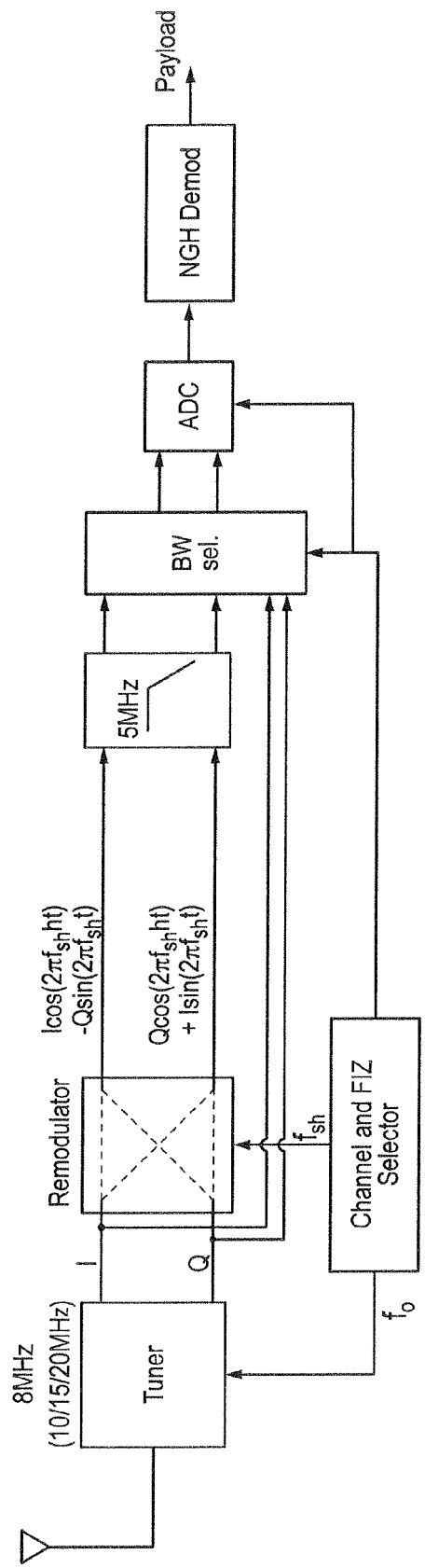
FIG. 7 is a schematic diagram illustrating an alternative embodiment of a receiver according to an embodiment of the present invention.

FIG. 7 is a schematic diagram illustrating a receiver according to another embodiment of the present invention. More specifically, FIG. 7 shows an alternative receiver architecture to that of FIG. 6. Either of the receivers of FIGS. 6 and 7 could be used to adjust in effect the analogue receive bandwidth to be appropriate to either the full symbol bandwidth to receive the preamble of, and typically the whole, first frame of a super-frame, or to receive a frequency zone for the remainder of the frames of the super-frame.

Figure 8:
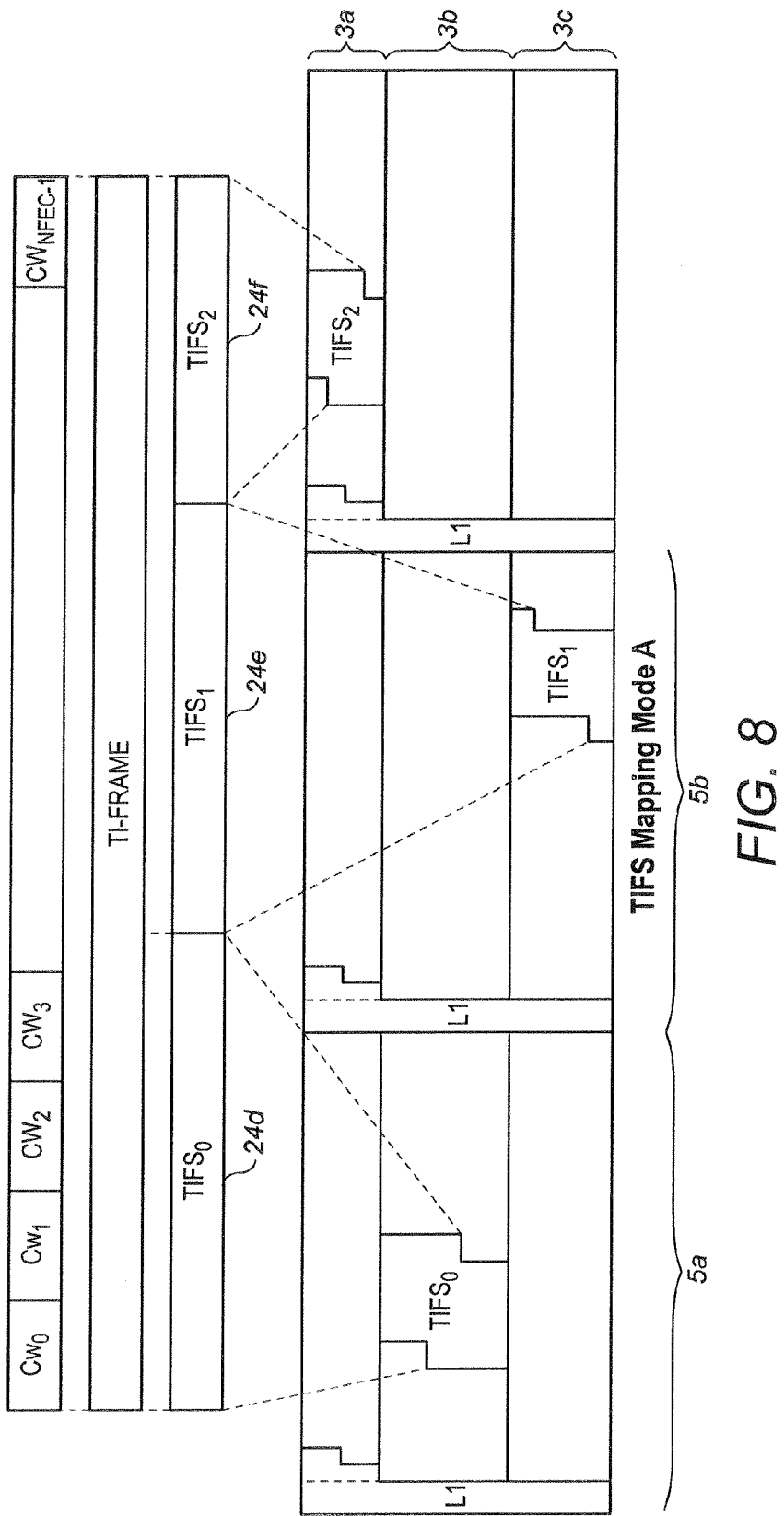
FIG. 8 is a schematic diagram illustrating a mapping of frequency interleaving zones to physical layer zones in Mode A according to an embodiment of the present invention.

FIG. 8 is a schematic diagram illustrating mapping of frequency interleaving zones to physical layer zones in Mode A according to an embodiment of the present invention. More specifically, FIG. 8 illustrates time interleaving frame segments 24d, 24e, 24f mapped to different frequency zones of successive frames.

Figure 9:
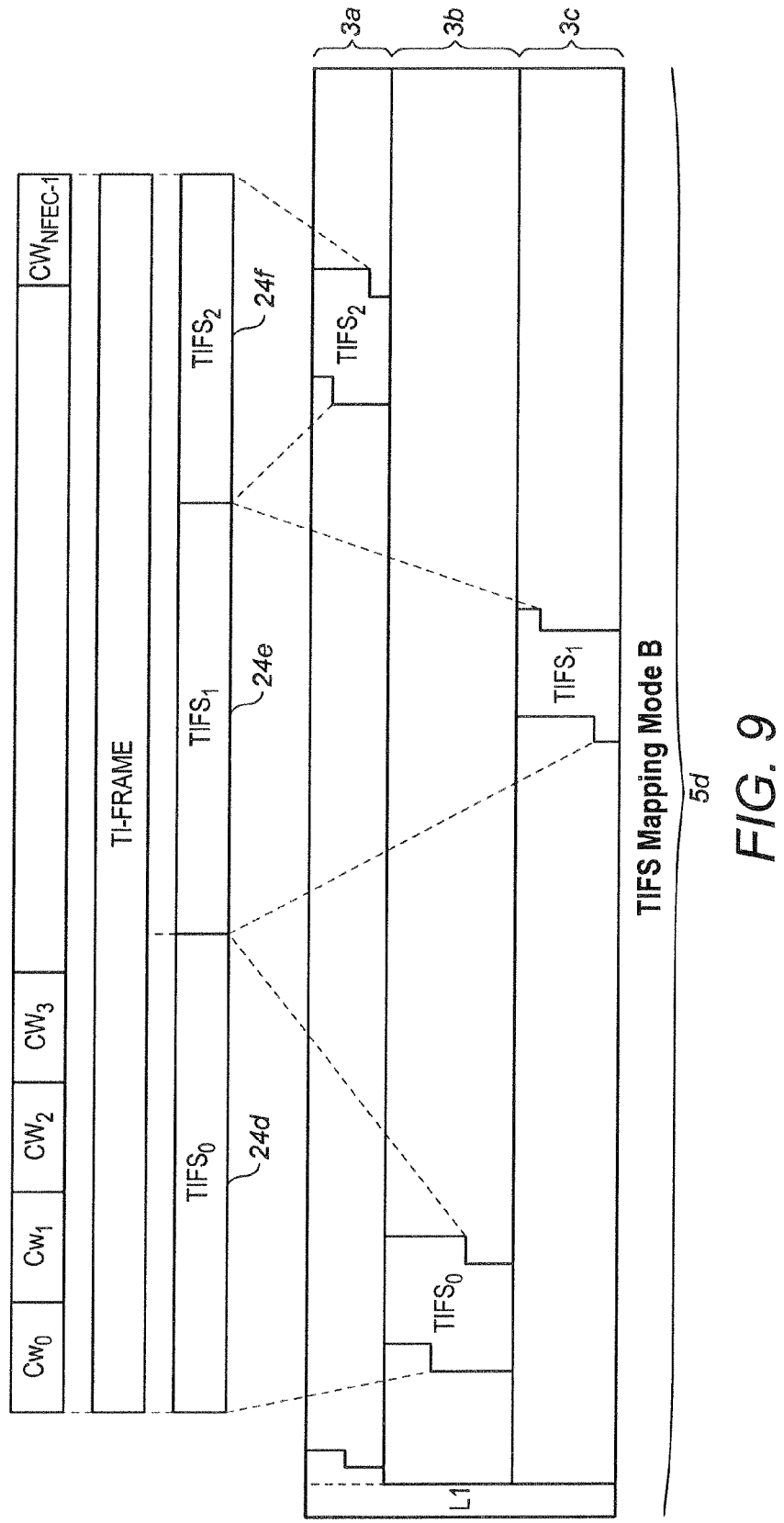
FIG. 9 is a schematic diagram illustrating a mapping of frequency interleaving zones to physical layer zones in Mode B according to an embodiment of the present invention.

FIG. 9 is a schematic diagram illustrating mapping of frequency interleaving zones to physical layer zones in Mode B according to an embodiment of the present invention.

More specifically, FIG. 9 illustrates that the time interleaving frame segments 24d, 24e, 24f may be mapped to different frequency zones of a given frame 5d.

FIGS. 10 to 18 provide examples of signalling words that may be used in embodiments of the present invention, and are described in detail as follows.

FIG. 10 is a table illustrating an example of an L1-config signalling field according to an embodiment of the present invention. The NUM_PLP_IN_L1DYN field 30 is specific to embodiments of the present invention. The total number of physical layer pipes used during the super-frame is indicated by NUM_PLP, and the limit, applicable to each of the frames in the super-frame, to the number of physical layer pipes for which signalling information is carried in the first signalling information field is carried by NUM_PLP_IN_L1DYN 30.

FIG. 11 is a table illustrating an example of an L1-dynamic signalling field (which may also be referred to herein as a first signalling information field) according to an embodiment of the present invention. The fields indicated by reference numerals 32 and 34 are specific to embodiments of the present invention. More specifically, the fields indicated by reference numeral 32 relate to information regarding the physical layer pipes for which information is carried within the L1 dynamic word, rather than the L1 dynamic-EXT word, i.e., the signalling information field. In particular, NUM_PLP_IN_L1DYN indicates a number of data streams signalled in the first signalling information in the current frame, PLP_ID indicates an ID of the PLP carrying the data stream, PLP_START indicates a start (location) of that PLP in the frame, and PLP_NUM_BLOCKS refers to a number of FEC blocks encapsulated in that PLP. The fields indicated by reference numeral 34 are NUM_PLP_ext, which may indicate a number of active PLPs in the second signalling part (in case the number of PLPs in the frame exceeds the limit), and NUM_IDLE_PLP refers a number of idle PLPs in the current frame FIG. 12 is a table illustrating an example of an L1-dynamic-Ext signalling field (which may also be referred to as a second signalling information field herein) according to an embodiment of the present invention. The signalling word is specific to embodiments of the present invention. The parts indicated by reference numeral 36 carry signalling information relating to physical layer pipes for which the information was not carried in the L1-dynamic word, and signalling information relating to idle physical layer pipes. PLP_ID, PLP_START, PLP_NUM_BLOCKS are same as described with reference to Reference Numeral 32 but here for the PLPs in the extended part PLP_DELTA are the relative timing for when the idle PLP will become active again.

FIG. 13 is a table illustrating another example of an L1-config signalling field according to an embodiment of the present invention. More specifically, FIG. 13 illustrates a further example of an L1-config (configuration) signalling word, including signalling information relating to time interleaving frame segments. The parts indicated by reference numerals 38, 40, and 42 are specific to embodiments of the present invention. Select elements from the table of FIG. 15 are described in detail as follows:

NUM_FIZ: Number of Frequency Interleaving Zones in the current frame;
NUM_TIFS_a: Number of Time Frequency Interleaving Segments active in the frame;
PLP_TIF_NUM_BLOCKS: Number of FEC blocks used in one time interleaving frame for a given PLP;
FIZ_LENGTH: The size of one FIZ in OFDM cells; and
FIZ_MAPPING_TYPE: To indicate if mode A or mode B is used (time-wise or frequency-wise mapping).

FIG. 14 is a table illustrating another example of an L1-dynamic signalling field according to an embodiment of the present invention. More specifically, Referring to FIG. 14, an L1-dynamic signalling word (which may also be referred to as a first signalling information field herein) includes signalling relating to time interleaving frame segments. The parts indicated by reference numerals 44 and 46 are specific to embodiments of the present invention. Select elements from the table of FIG. 15 are described in detail as follows:

PLP_TIFS_START: Start of the PLP in the given TIFS;
PLP_TIFS_LENGTH: Size of the PLP in cells in the given TIFS;
PLP_TIFS_TYPE: Type of the PLP in the given TIFS (PLP Type 1 or Type 2);
PLP_TIFS_DRAME_IDX: Frame index of the PLP mapped onto the given TIFS;
PLP_TUFS_DELTA: relative timing from the current TIFS to the next TIFS, which will carry the given PLP (PLP ID); and
FIZ_ID: The ID of the FIZ carrying the TIFS.

FIG. 15 is a table illustrating another example of an L1-dynamic-Ext signalling field according to an embodiment of the present invention. Referring to fields 48 in FIG. 15, an L1-config-ext signalling word (referred to as the second signalling information field) may include signalling information relating to time interleaving frame segments. The signalling word is specific to embodiments of the present invention. The TIFS_ext is similar to corresponding fields of reference numeral 44, but used for extended TIFS. IDLE_PLP is similar to corresponding fields of reference numeral 36.

FIG. 16 is a table illustrating an example of in-band signalling according to an embodiment of the present invention. Referring to FIG. 16, an in-band signalling word may include signalling relating to time interleaving frame segments. The parts indicated by reference numeral 50 are specific to embodiments of the present invention. Reference numeral 50 corresponds to fields similar to the fields corresponding to reference numeral 44, but since the present example corresponds to in-band signalling, this information is embedded to the given/desired PLP.

FIG. 17 is a table illustrating an example of an L1-pre signalling field according to an embodiment of the present invention. Referring to FIG. 17, an L1-pre signalling word may include signalling information relating to physical layer zones. The fields indicated by reference numeral 52 are specific to embodiments of the present invention. In particular, PZ0_PILOT_PATTERN indicates the pilot pattern in the Physical Zone 0 (First physical zone), and PZ0_GUARD_INTERVAL indicates the guard interval used in the Physical Zone 0 (first Physical Zone).

FIG. 18 is a table illustrating another example of an L1-config signalling field according to an embodiment of the present invention. Referring to FIG. 18, an L1-config signalling word may include signalling relating to physical layer zones. The parts indicated by reference numerals 60, 54, 56, and 58 are specific to embodiments of the present invention. fields 60 and 54 are the same as fields 38 and 40, respectively, described with reference to FIG. 13. With respect to fields 56 and 58, FIZ_LENGTH is a number of cells (capacity of the frequency interleaving zone), FIZ_MAPPING_TYPE indicates either frequency-wise or time-wise mapping is used (mode A and B), PZ_FFT_SIZE the FFT is size of the Physical Zone, PZ_PILOT_PATTERN is a pilot pattern used in the given physical zone, and PZ_GUARD_INTERVAL is an OFDM guard interval used in the given physical zone.

Figure 19:
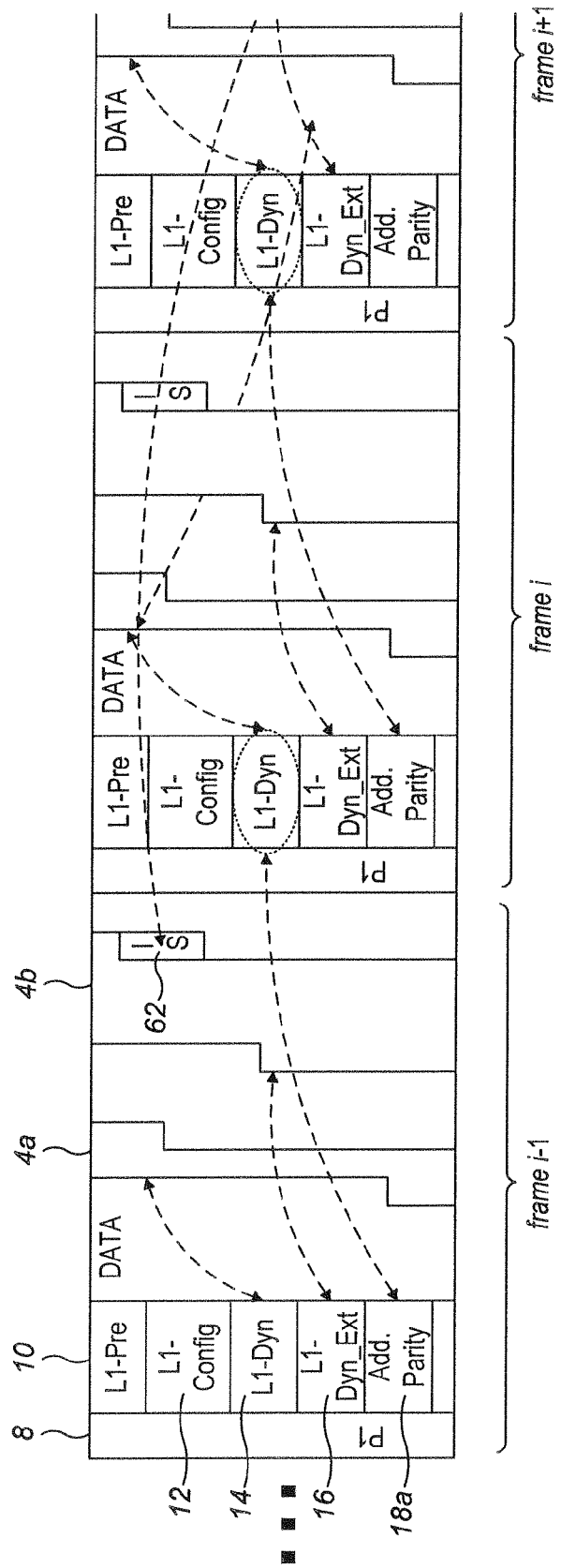
FIG. 19 is a schematic diagram illustrating an example signalling in a data frame according to an embodiment of the present invention.

FIG. 19 is a schematic diagram an example of signalling in a data frame according to an embodiment of the present invention. Referring to FIG. 19, the dashed lines indicate that signalling information relating to a data stream that does not use in-band signalling 4a is preferably included in the first signalling information field L1-Dyn 14, but may alternatively be included the second information field, L1-Dyn_Ext 16 according to another embodiment of the present invention.

Furthermore, signalling information relating to the data streams 4a that does not use in-band signalling is included in the first information field in preference to signalling information for a data stream 4b that uses In-band Signalling (IS) 62.

According to embodiments of the present invention, a more robust coding scheme may be used for the first information field than for the second signalling information field, further increasing the robustness of the first signalling information field. The coding scheme for the first information field may have additional parity bits in comparison with a coding scheme used for the second information field, and may use a coding scheme having reduced shortening and puncturing in comparison with a coding scheme used for the second information field.

The above-described embodiments are provided as illustrative examples of the present invention. Any feature or features described in relation to any of these embodiments may be used alone, or in combination with other described features, and may also be used in combination with one or more features of any of the other described embodiments, or any combination of any other of the described embodiments of the present invention. Furthermore, equivalents and modifications not described above may also be employed without departing from the scope of the present invention, which is defined in the accompanying claims.

What is claimed is:

1. A method of transmitting data that includes a plurality of data streams in a wireless broadcast system, the method comprising:
   mapping the plurality of data streams onto a super-frame that includes a plurality of frames, each frame including a preamble section and a data section, the preamble section and the data section being time-multiplexed, the data section carrying at least parts of said plurality of data streams, and the preamble section carrying at least signalling information;
   inserting signalling information in a first signalling information field for assisting in the reception of a first number of said plurality of data streams for a given frame, the first number being less than or equal to a limit applicable to each of the plurality of frames, and the first signalling information field being of a size that is the same for each of the plurality of frames;
   dependent on a number of data streams for the given frame being greater than the limit, inserting signalling information in a second signalling information field that assists in the reception of further of said plurality of data streams for the given frame, the second signalling information field being of a variable size;
   inserting said first and second signalling information fields in a preamble section of said given frame; and
   transmitting the plurality of frames.

2. The method of claim 1, further comprising inserting, in the first signalling information field, information indicating whether a second signalling information field is to be transmitted.

3. The method of claim 1, further comprising, dependent on a number of data streams for the given frame being greater than said limit, inserting, in the first signalling information field, information indicating a length of the second signalling information field.

4. The method of claim 1, further comprising inserting, in the second information field, information indicating idle data streams from among the plurality of data streams.

5. The method of claim 1, further comprising determining the limit according to statistical information relating to a number of active or idle data streams per frame for the plurality of frames.

6. The method of claim 1, further comprising determining the limit according to at least a robustness of a scheme employed for the transmission of at least one of the first and second signalling information field.

7. The method of claim 6, wherein the scheme includes at least one of a modulation and coding scheme, a Multiple Input Multiple Output (MIMO) scheme, a Fast Fourier Transform size, a pilot pattern, and a guard interval.

8. The method of claim 1, further comprising inserting signalling information that relates to data streams requiring higher robustness in at least one of the first and second signalling information fields in a manner that prioritizes insertion of the signalling information that relates to the data streams requiring the higher robustness in the first signalling information field, over insertion of the signalling information that relates to the data streams requiring higher robustness in the second information field.

9. The method of claim 1, further comprising coding the first and second information fields by using a more robust coding scheme for the first information field than for the second signalling information field.

10. The method of claim 9, further comprising coding the first and second information fields by using a coding scheme for the first information field having a greater number of parity bits than a number of parity bits for a coding scheme used for the second information field.

11. The method of claim 9, further comprising coding the first and second information fields by using, with respect to the first information field, a coding scheme having reduced shortening and puncturing than shortening and puncturing for a coding scheme used for the second information field.

12. The method of claim 1, further comprising inserting signalling information relating to data streams that do not use in-band signalling in at least one of the first and second signalling information fields in a manner that prioritizes insertion of the signalling information relating to the data streams that do not use the in-band signalling in the first signalling information field over insertion of the signalling information relating to the data streams that do not use the in-band signalling in the second information field.

13. The method of claim 1, further comprising inserting, in the first information field, signalling information relating to data streams that do not use in-band signalling in priority over data streams that use in-band signalling.

14. The method of claim 1, further comprising inserting signalling information relating to data streams that do not use in-band signalling in the first signalling information field without inserting the signalling information relating to the data streams that do not use in-band signalling in the second signalling information field.

15. The method of claim 1, further comprising inserting data identifying the limit in the preamble section of the given frame.

16. The method of claim 15, further comprising inserting the data identifying the limit within the preamble of each of the plurality of frames.

17. An apparatus for transmitting data that includes a plurality of data streams in a wireless broadcast system, the apparatus comprising:
a transmitter for:
mapping the plurality of data streams onto a super-frame comprising a plurality of frames, each frame comprising a preamble section and a data section, the preamble section and the data section being time-multiplexed, the data section carrying at least parts of said plurality of data streams, and the preamble section carrying at least signalling information;
inserting signalling information in a first signalling information field for assisting in the reception of a first number of said plurality of data streams for a given frame, the first number being less than or equal to a limit applicable to each of the plurality of frames, and the first signalling information field being of a size that is the same for each of the plurality of frames;
dependent on a number of data streams for the given frame being greater than said limit, inserting signalling information in a second signalling information field for assisting in the reception of further of said plurality of data streams for the given frame, the second signalling information field being of a size that may vary from that of others of the plurality of frames;
inserting said first and second signalling information fields in a preamble section of said given frame; and
transmitting the plurality of frames.

18. A method of receiving data comprising a plurality of data streams in a wireless broadcast system, the plurality of data streams having been mapped onto a super-frame comprising a plurality of frames, the method comprising:
receiving a first information field for a given frame from among the plurality of frames, wherein each frame comprising a preamble section and a data section, the preamble section and the data section being time-multiplexed, the data section carrying at least parts of said plurality of data streams, and the preamble section carrying at least signalling information, when a preamble section of a given frame includes:
the first signalling information field including signalling information for assisting in the reception of a first number of said plurality of data streams for the given frame, the first number being less than or equal to a limit applicable to each of the plurality of frames, and the first signalling information field being of a size that is the same for each of the plurality of frames; and
dependent on a number of data streams for the given frame being greater than said limit, a second signalling information field including signalling information for assisting in the reception of further of said plurality of data streams for the given frame, the second signalling information field being of a variable size; and
receiving the second signalling information field according to an indication in the first signalling information field that indicates whether the second signalling information field is to be transmitted.

19. The method of claim 18, wherein the second information field is received through use of an indication received in the first signalling information field that indicates a length of the second signalling information field.

20. The method of claim 18, further comprising preventing attempts to receive data streams that are indicated, in the second information field, as being idle.

21. An apparatus for receiving data that includes a plurality of data streams in a wireless broadcast system, the plurality of data streams being mapped onto a super-frame comprising a plurality of frames, the apparatus comprising:
a receiver for receiving a first signalling information field for a given frame from among the plurality of frames, and receiving a second signalling information field according to an indication in the first signalling information field that indicates whether a second signalling information field is to be transmitted, wherein each frame includes a preamble section and a data section, the preamble section and the data section being time-multiplexed, the data section carrying at least parts of said plurality of data streams, and the preamble section carrying at least signalling information, wherein a preamble section of a given frame includes:

the first signalling information field including signalling information for assisting in the reception of a first number of said plurality of data streams for the given frame, the first number being less than or equal to a limit applicable to each of the plurality of frames, and the first signalling information field being of a size that is the same for each of the plurality of frames; and dependent on a number of data streams for the given frame being greater than said limit, the second signalling information field including signalling information for assisting in the reception of further of said plurality of data streams for the given frame, the second signalling information field being of a variable size.

* * * * *